July 17, 1951  R. A. PATTERSON  2,560,977
HYDRAULIC BRAKE LINING PROTECTOR
Filed May 7, 1948
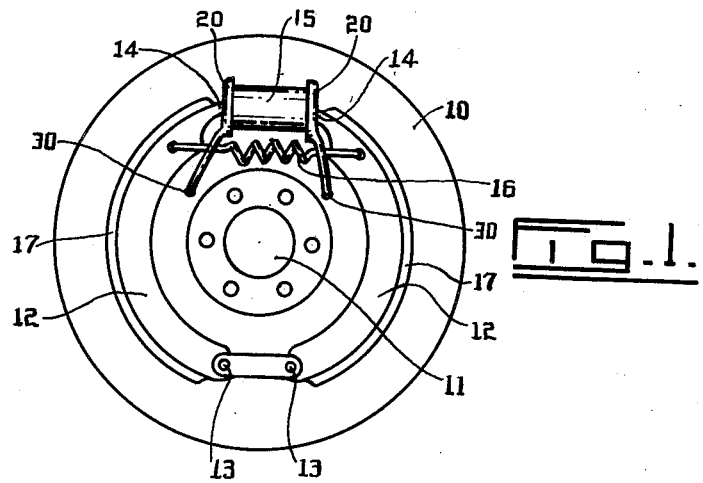
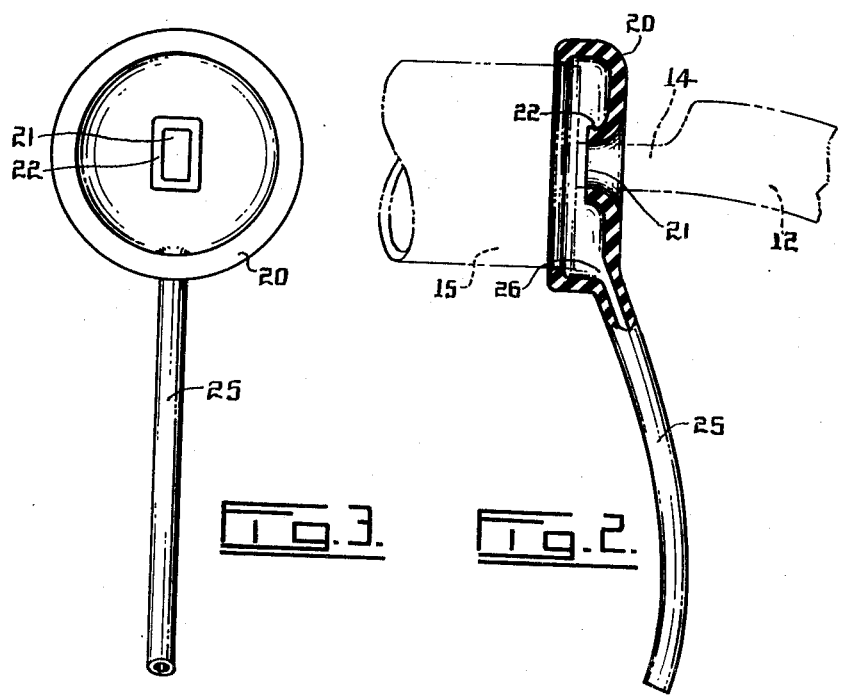
INVENTOR
ROY. A. PATTERSON
BY
Fetherstonhaugh & Co.
ATTORNEYS Patented July 17, 1951

2,560,977

UNITED STATES PATENT OFFICE 2,560,977

HYDRAULIC BRAKE LINING PROTECTOR

Roy A. Patterson, Vancouver, British Columbia, Canada

Application May 7, 1948, Serial No. 25,569

4 Claims. (Cl. 188—152)

This invention relates to brake lining protectors.

An object of the present invention is the provision of a device for protecting the brake linings of vehicles having hydraulically controlled brakes from the hydraulic or brake fluid.

One of the disadvantages of hydraulic brakes is the fact that the operating fluid sometimes leaks out of the cylinder unit and gets on to the brake linings. This has two very dangerous effects. It either causes the brakes to grip suddenly, or not to grip at all. If the brake grips suddenly, this has a tendency to throw the vehicle to one side or the other. This can throw a speeding vehicle off a highway or into traffic moving in the opposite direction. Of course, failure of the brakes is exceedingly dangerous.

It is the main purpose of this invention to reduce to an absolute minimum the possibility of any hydraulic fluid which might leak out of the operating cylinder from reaching the brake linings. This is accomplished by providing a cup which is adapted to fit over an end of the cylinder unit to catch any fluid which may leak therefrom. This cup is provided with means for removing the fluid therefrom to a point where it cannot be harmful. It is preferable that this fluid be discharged on to the outer surface of the backing plate so that it may be seen, thus serving as a warning that the hydraulic or braking fluid is being lost. This cup is quite inexpensive and it may be very easily installed without any necessity for altering the normal construction of the braking apparatus.

Other objects and features of the invention will appear from the accompanying description with reference to the drawings, in which:

Figure 1 is a side view of a vehicle wheel backing plate showing the brake control apparatus and the brake lining protectors, Figure 2 is an enlarged side elevation, partly in section, of a lining protector, and Figure 3 is an end view of the protector.

Referring more particularly to the drawings, 10 is an ordinary wheel backing plate which is mounted on a vehicle in the usual manner, and having a central opening 11 through which the axle extends, upon which a wheel and its brake drum are rotatably mounted, said wheel and drum being omitted for the sake of clarity since they do not form any part of this invention. Brake shoes 12 are pivotally mounted at one end at 13 on the backing plates and have arms 14 at their opposite ends, each of which extends into an end of a hydraulic cylinder unit 15 which is also mounted on the backing plate. The arms 14 are operatively connected to the cylinder unit so that they may be moved outwardly or inwardly in relation thereto. A spring arrangement 16 may be provided for normally drawing the brake shoes towards each other, thus moving the arms 14 into the cylinder unit. The shoes 12 are provided with the usual brake linings 17 on their outer surfaces. This braking apparatus is constructed and operated in the usual manner.

The brake lining protector consists of a cup 20 which is preferably formed of resilient material such as rubber or plastic, although it may be formed of any other suitable material. This cup is adapted to fit snugly over an end of the cylinder unit 15. This cup is formed with an opening 21 through which an arm 14 of a brake shoe slidably extends. This opening is just large enough to accommodate the arm, and the cup is preferably formed with an inwardly projecting flange 22 which surrounds the opening 21. This flange engages the arm 14 in order to prevent any liquid from adhering to its surface and passing out of the cup.

Suitable means associated with the cup is provided for removing any fluid therefrom, the preferred way of accomplishing this is to provide a tube 25 which communicates with the bottom of the cup at 26, see Fig. 2. Any fluid that finds its way into the cup will run to the bottom thereof and out through the tube 25. This tube may extend to a point where the fluid discharged therefrom cannot come into contact with the brake linings 17.

It is desirable to bore a small hole 30 in the backing plate 10 for each tube 25 so that the latter extends therethrough and outside the backing plate. Furthermore, it is preferred to arrange the tube so that it will discharge on to the outer surface of the plate.

As shown in Fig. 1 there is a cup 20 fitted over each end of the cylinder unit 15. As the hydraulic fluid is pumped into the unit under pressure it quite frequently leaks out through the ends thereof where the arms 14 extend therethrough. When this happens, the fluid is caught by the cup 20 and directed by the tube 25 to the outside of the backing plate. When this fluid is discharged on to the outer surface of the backing plate, it serves as an indication that the braking or hydraulic fluid is leaking from the cylinder. Thus, the leak is made apparent, so that it may be remedied before much fluid is lost, and in this way the protectors help to eliminate the possibility of so much fluid being lost that the brakes become inoperative. At the present time, this is usually noticed only when the driver of the vehicle attempts without success to apply his brakes.

This lining protector, therefore, eliminates the possibility of any of the hydraulic fluid getting on to the brake linings. This in turn prevents the brakes from binding or from becoming ineffective through liquid accumulating thereon.

What I claim as my invention is:

1. In vehicle wheel braking apparatus, the combination with a backing plate having a hydraulic cylinder unit and a brake shoe mounted on the inner surface thereof, said shoe having an arm extending into an end of and operatively connected to the cylinder unit, of a brake lining protector comprising a cup adapted to fit snugly over the end of the cylinder unit, an opening in the cup through which the arm slidably extends, said opening being just large enough to accommodate the arm whereby liquid is prevented from passing through said opening, and a tube connected to the bottom of the cup and communicating with the interior thereof for conducting any fluid away therefrom.

2. In vehicle wheel braking apparatus, the combination with a backing plate having a hydraulic cylinder unit and a brake shoe mounted on the inner surface thereof, said shoe having an arm extending into an end of and operatively connected to the cylinder unit, of a brake lining protector comprising a cup adapted to fit snugly over the end of the cylinder unit, an opening in the cup through which the arm slidably extends, said opening being just large enough to accommodate the arm whereby liquid is prevented from passing through said opening, and a tube communicating with the bottom of the cup and extending through the backing plate for removing any fluid from the cup and discharging it on the outer surface of the plate.

3. In vehicle wheel braking apparatus, the combination with a backing plate having a hydraulic cylinder unit and brake shoes mounted on the inner surface thereof, said shoes having arms extending into opposite ends of the cylinder unit and operatively connected thereto, of brake lining protectors comprising cups adapted to fit snugly over the opposite ends of the cylinder unit, an opening in each cup through which an arm slidably extends, said openings being just large enough to accommodate their arms whereby liquid is prevented from passing through said openings, and tubes communicating with the bottoms of the cups and extending through the backing plate for removing any fluid from their respective cups and discharging it on the outer surface of the plate.

4. In vehicle wheel braking apparatus, the combination with a backing plate having a hydraulic cylinder unit and a brake shoe mounted on the inner surface thereof, said shoe having an arm extending into an end of and operatively connected to the cylinder unit, of a brake lining protector comprising a cup adapted to fit snugly over the end of the cylinder unit, an opening in the cup through which the arm slidably extends, said opening being just large enough to accommodate the arm, a flange formed on and projecting inwardly from the cup, said flange surrounding the opening and being shaped to fit around the arm, and a tube communicating with the bottom of the cup and extending through the backing plate for removing any fluid from the cup and discharging it on the outer surface of the plate.

ROY A. PATTERSON.

REFERENCES CITED

The following references are of record in the file of this patent:

UNITED STATES PATENTS

| Number | Name | Date |
|---|---|---|
| 1,019,755 | Brush | Mar. 12, 1912 |
| 1,227,543 | Limpp et al. | May 22, 1917 |
| 2,093,557 | Heidloff | Sept. 21, 1937 |
| 2,161,640 | Schnell | June 6, 1939 |
| 2,208,042 | Nothiger | July 16, 1940 |
| 2,303,699 | Main | Dec. 1, 1942 |
| 2,329,095 | White | Sept. 7, 1943 |
| 2,371,937 | Weeks et al. | Mar. 20, 1945 |